W. A. HULL.
COMBINED WATER COOLER AND FILTER.
APPLICATION FILED JUNE 13, 1907.
970,504.
Patented Sept. 20, 1910.
2 SHEETS—SHEET 1.
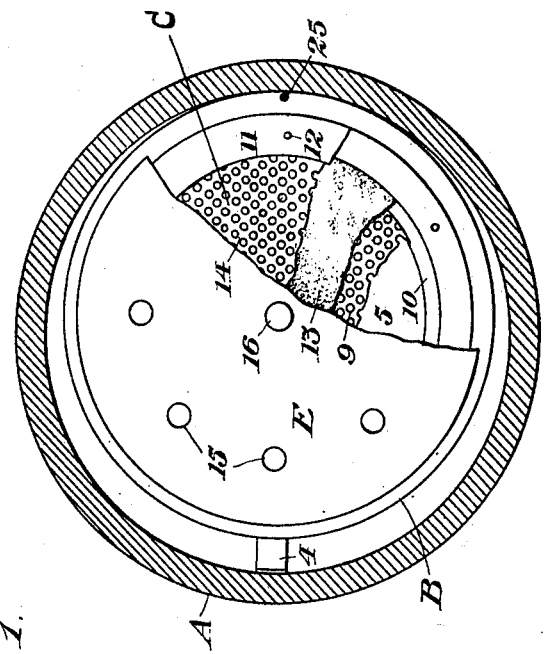
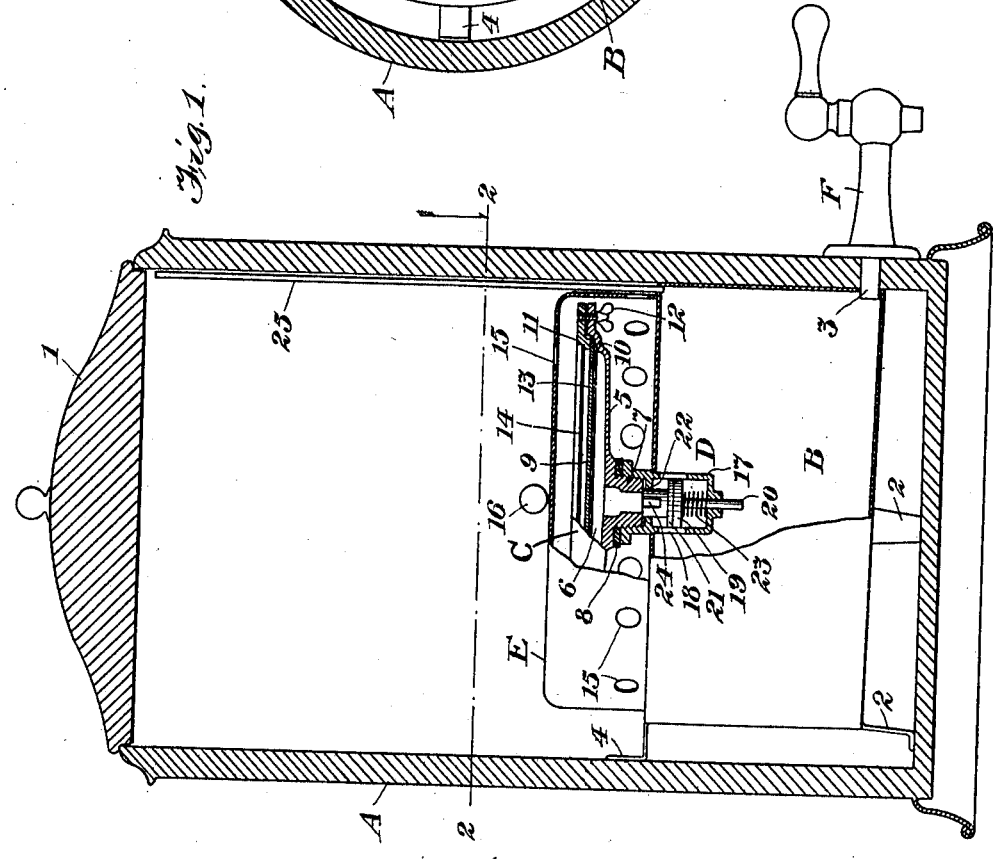
Witnesses:
Robert Head
Wolcott A. Hull, Inventor
By his Attorney

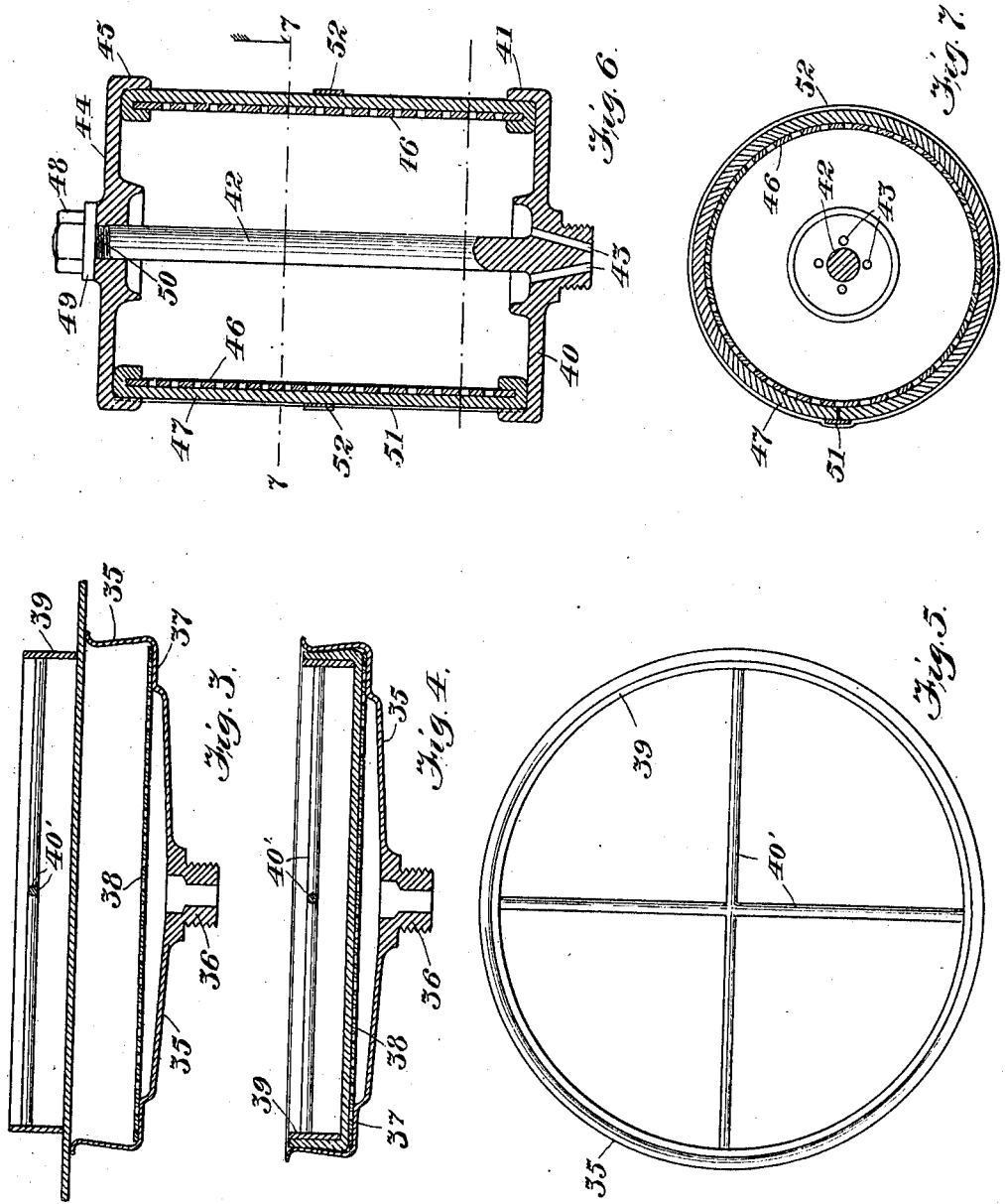

UNITED STATES PATENT OFFICE.

WOLCOTT A. HULL, OF NEW YORK, N. Y., ASSIGNOR TO GEORGE J. T. HENNINGS, OF NEW YORK, N. Y.

COMBINED WATER COOLER AND FILTER.

970,504.  Specification of Letters Patent. Patented Sept. 20, 1910.

Application filed June 13, 1907. Serial No. 378,690.

*To all whom it may concern:*

Be it known that I, WOLCOTT A. HULL, a citizen of the United States, and a resident of the borough of Manhattan, city, county, and State of New York, have invented certain new and useful Improvements in Combined Water Coolers and Filters, of which the following is a specification.

My invention relates to devices adapted to deliver iced filtered water in highly efficient manner and having the advantages of decided simplicity of construction, operation, and maintenance.

In the drawings which represent one of the specific forms which my invention may take together with modifications of the filter devices, Figure 1 is a vertical section partly in elevation of a combined water-cooler and filter within my invention, showing some of the parts broken away; Fig. 2 is a horizontal section through line 2—2 in Fig. 1 looking in the direction of arrow; Figs. 3, 4, and 5 relate to a modified form of filter device in which Fig. 3 shows parts detached and in position preparatory to insertion of filter material into its working position shown in Fig. 4, Fig. 5 being a top plan view of the member 39 of Figs. 3 and 4; Fig. 6 is a vertical mid-section partly in elevation of still another form of filtering device applicable to be used as a substitute for the filtering device in Fig. 1; and Fig. 7 is a horizontal section through line 7—7 in Fig. 6 looking in direction of arrow.

Describing now my improvements with particular reference to their specific embodiments in the accompanying drawings and reserving it to the claims to point out the novel features and referring first to the devices shown in Fig. 1, these comprise an outer chamber A to receive ice and water to be filtered, and an inner chamber B to receive said water after it has been filtered and within which the filtered water is adapted to be retained and cooled. C is a filtering device supported and adapted to filter the water from the outer chamber and deliver the filtrate into the inner chamber. D is a valve device controlling the opening in the inner chamber into which the filtering device delivers, and acts to close said opening automatically when the filtering device is removed from the inner chamber for cleaning or any other reason and hence at such time prevents the inflow of unclean water or contaminating material into the inner chamber. E is a shield or cover adapted to prevent injury to the filtering device when ice is dumped into the outer chamber and for this purpose is supported independently of said filtering device. F is a means for delivering the contents of the inner chamber to the outside for drinking or other purposes and comprises a cock or other means for controlling the flow.

Describing now more in detail the various means generally outlined above as making up the complete device of Fig. 1, the outer chamber A may take the form shown, which is practically that of an ice-cooler with lid 1. The inner chamber B for filtered water will be seen to be wholly contained in the outer chamber and having a smaller cross section, is consequently surrounded on its sides with a space which when ice and water is put into the outer chamber permits free circulation of ice water over the sides or periphery of the inner chamber. Moreover said chamber B is supported within the outer chamber above its bottom on legs 2 which permit free circulation of the ice water of the outer chamber underneath said chamber B.

In shape and materials, chamber B in the particular construction shown is practically a cylindrical metal box with closed flat ends, the diameter of the box being smaller than the inside diameter of the outer chamber A and the chamber being supported on legs 2 as previously stated and is in side contact with the outer chamber at the place where the tube 3 of delivery device F connects through the wall of said outer chamber with a suitable delivery opening in the inner chamber B. One or more members 4 may be provided to stationarily secure in a convenient way the inner chamber B in the position described within the outer chamber.

The filtering device C may be described as consisting of a cup member 5 with means for removably supporting filtering material above the bottom of said cup, thereby creating between the filtering material and the cup a chamber 6 conveniently designated as a filter chamber. The cup 5 is perforated with an opening through its bottom and leading from said opening is an externally screw-threaded tubular portion 7 which serves to removably connect the cup or filtering device to the valve D, or in other words to the inner chamber B. A washer 8 is interposed to make this connection watertight.

Describing now the specific means for removably supporting the filtering medium in the cup 5, in the first place the filtering material 13 in a layer or layers is supported on a perforated plate 9 and this plate in turn is supported above the bottom of the cup by resting at its periphery on an annular step 10 formed in the cup. To hold the filtering material securely within the cup and prevent leakage of water around its edge without going through its substance, a ring member 11 adapted to be detachably secured to the rim part of the cup 5 by wing-nuts 12 is provided, which ring member 11 is adapted to bear down against the periphery of the filtering material.

Located in the interior space within the ring 11 is a perforated plate 14 which in the construction shown is secured rigidly by its periphery to the ring and may or may not be located to press against the top of the filtering material. A cover E perforated with holes 15 is provided to rest loosely on top of inner chamber B and cover over and protect the filter device C. A knob 16 on the cover is provided as a convenient means to lift the cover off the filtering device to permit access thereto.

The valve D comprises an outer casing 17 secured within an opening through the top of the inner chamber B, said casing of the valve being closed at the bottom except for a central opening to guide a valve stem and being open at its top with internal screw-threads to receive the screw-threaded tubular portion 7 of the filter device C. The valve casing 17 within the inner chamber B is provided with side openings or perforations 18.

Mounted reciprocatingly within casing 17 is a valve stem 20 carrying valve 19. A washer 21 on top of valve 19 contacts with seat 22 of the valve to completely close the opening from the outer into the inner chamber, when said valve is seated. This automatically occurs whenever the filter device C is removed, because then the spring 23 being free to act, forces the valve 19 and washer 21 against seat 22 and thereby completely closes the inner chamber B against influx from the outside. In other words, removing the filtering device C for any purpose automatically closes the opening which the filter device controls into the inner chamber and prevents passage into said inner chamber of impure materials or any materials and thereby keeps said chamber pure and free from contamination. On the other hand when the filtering device C is replaced, the very act of screwing it into valve-device D depresses valve stem 20 by contacting with the enlarged slotted head-portion thereof and thereby unseats valve 19 and permits free passage and connection between the conduit from the filtering device through the slot 24 in said head of valve-stem 20, out into the interior of valve casing 17, and thence through its side openings 18 into the inner chamber B.

The operation of the described devices is as follows: Water and ice is put into the outer chamber A upon the covered filtering device C and inner chamber B until a level is reached as far above the filtering device as may be desired. The impure ice water thereupon begins to filter by gravity into the inner chamber B by passing through holes 15 in cover E thence down through the filtering material in device C into the filtering chamber 6 of said device, then through slot 24 in the valve stem and out from the valve casing through its side-openings 18 into the filtered water chamber B. The water from outer chamber A will so continue to filter by gravity, until the inner chamber B is completely filled, an air pipe 25 being provided to permit the escape of air from said inner chamber.

The impure ice water in chamber A conveys to the filtered water in chamber B its own low temperature and does this in the quickest and most effective manner possible, because the combination of parts is such that filtered water chamber B is substantially surrounded and in contact with the ice water of chamber A without any substantial interference either from the necessary supports for the filtered water chamber or the necessary connection between said chamber and outer chamber A for the delivery device F. In other words, the combination of parts is such that chamber B is surrounded on its sides and bottom with the ice water of the outer chamber. Moreover it is a feature next to be pointed out, that chamber B is also surrounded on its top without any interference from the filtering device C. Thus, the connection and support of the filtering device C with chamber B is such as to permit free circulation of the ice water between the bottom of the filter device and the top of the chamber, as will appear from an inspection of Fig. 1. Again I preferably make inner chamber B entirely of metal, or at any rate of a material best adapted rapidly to convey the low temperature of the surrounding ice water to its contents.

Referring now to the modified form of filtering device shown in Figs. 3 to 5, this consists of a cup member 35 having an externally screw-threaded outlet 36 projecting below its bottom. Upon an annular step 37 rests a perforated plate 38 which is supported thereby above the bottom of the cup to leave a filter chamber beneath it. The side walls of the cup 35 are more or less vertical as shown and preferably have an outturned or rolled-over rim. Adapted to telescope within the walls of cup 35, is a ring 39 provided with members 40 which stiffen the ring and act as a handle. The outside diameter of ring 39 is designed relative to the inside diameter of cup 35 to have enough clearance to snugly receive in said clearance space a layer or layers of suitable filtering material. To insert the filtering material, a disk thereof is placed on top of cup 35 as shown in Fig. 3, and ring 39 positioned as shown is forced downwardly into the telescoped position within the cup shown in Fig. 4 with the filtering material securely held wedged at the sides between the ring and the inside of the cup. Thus the filtering device of Figs. 3 to 5 presents a convenient means of inserting and removing the filtering material which in the device C of Fig. 1 is accomplished by manipulating the wing nuts 12 to remove or replace the ring 11 between which and the cup the filtering material is secured, all as previously described. Otherwise the filtering device of Figs. 3 to 5 is like that of Fig. 1 with its tubular outlet 36 screw-connecting into valve D and protected by cover E.

The filtering device of Fig. 6 comprises a bottom disk 40 having a rim 41 and a central spindle 42 secured thereto, screw-threaded at both ends and with openings or ducts 43 leading through the bottom screw-threaded portion. Located movably on the other end of spindle 42 is a second disk 44 having a rim 45 corresponding to that of disk 40. Between the disks 40 and 44 and having a diameter somewhat smaller than the inside diameter of the rims on the disks is a perforated cylinder 46. This cylinder acts as a support for the filtering material 47 wrapped in a layer about the cylinder with its top and bottom edges lapped over the ends of said cylinder and with the disks 44 and 40 pressed against the overlapped edges by nut 48 and washer 49 on threads 50 of spindle 42 tightened against disk 44. The layer of filtering material if simply wrapped about the cylinder 46 once, will naturally leave a space equal at least to the thickness of a line between the abutting edges of the material and would allow water to pass without going through the substance of said material. To avoid this and make a tight joint at said line of union, I provide a preferably metal strip 51 adapted to fit over the abutting edges of the filtering material for their entire length. This strip at its ends is received within the rims of the disks 40 and 44 and may carry one or more intermediate bands 52 to hold it tightly over the line of union between the edges of filtering material.

In use, the cylindrical filtering device of Fig. 6 is connected to the filtered water chamber B of Fig. 1 by connecting the screw-threaded nozzle on its bottom disk 40 with valve D. The impure ice water of chamber A filters by gravity through the material 47 into the filter chamber within the cylinder and thence passes by ducts 43 into the interior of valve D and out into chamber B.

The filtering materials used in the respective filter devices shown may be of any suitable sort such as layers of felt, asbestos, glass-wool or combinations of these and in addition may have bone-black, charcoal, fullers' earth and like materials between the layers.

Having described my invention, what I claim and desire to secure by Letters Patent is:—

1. In combination, a tank comprising a single chamber to receive ice and water to be filtered; a filtered water reservoir near the bottom of said tank surrounded above, below and on the side with the contents of the tank, and having a central opening through its top; a broad, shallow cup having a central bottom opening, said cup being located on top of the filtered water reservoir in removable connection therewith, with its bottom separated by a space therefrom and with its opening in communication with the opening in the top of the reservoir; a disk of filtering medium secured horizontally across the interior of said cup; a valve controlling the opening into the filtered water reservoir, said valve having normal tendency to close said opening and being pressed by the filter cup and opened when the cup is connected with the filtered water reservoir; and a faucet on the outside of the tank and connecting through the tank with the filtered water reservoir.

2. In combination, a tank comprising a single chamber to receive ice and water to be filtered; a filtered water reservoir near the bottom of said tank surrounded above, below and on the side with the contents of the tank, and having a central opening through its top; a cup provided with filtering material and having a bottom opening, said cup being located on top of the filtered water reservoir in removable connection therewith, with its bottom separated by a space therefrom and with its opening in communication with the opening in the top of the reservoir; and a faucet on the outside of the tank, connecting through the tank with the filtered water reservoir.

In witness whereof, I have signed my name to the foregoing specification in the presence of two subscribing witnesses.

WOLCOTT A. HULL.

Witnesses:
H. R. BAUER,
E. W. SCHERR, Jr.